United States Patent [19]

Giannotti

[11] E Re. 29,366

[45] Reissued Aug. 23, 1977

[54] SKI ANTI-CROSSING DEVICE

[75] Inventor: Hugo V. Giannotti, East Patchogue, N.Y.

[73] Assignee: Ski Dynamics, Inc., Bellport, N.Y.

[21] Appl. No.: 686,504

[22] Filed: May 14, 1976

Related U.S. Patent Documents

Reissue of:

[64] Patent No.: 3,863,943
Issued: Feb. 4, 1975
Appl. No.: 400,027
Filed: Sept. 24, 1973

[51] Int. Cl.[2] ..... A63C 11/00
[52] U.S. Cl. ..... 280/11.37 E
[58] Field of Search ..... 280/11.37 E

[56] References Cited

U.S. PATENT DOCUMENTS

| | | | |
|---|---|---|---|
| 2,237,998 | 4/1941 | Neuhauser | 280/636 |
| 2,455,920 | 12/1948 | Ebbley, Jr. | 280/11.37 E |
| 2,611,624 | 9/1952 | Gurvich | 280/11.37 E X |
| 2,625,405 | 1/1953 | Staff | 280/11.37 E |
| 3,148,891 | 9/1964 | Heuvel | 280/11.37 E |
| 3,295,860 | 1/1967 | Von Hoven | 280/11.37 E X |
| 3,357,714 | 12/1967 | Kuehn | 280/11.37 E |
| 3,601,421 | 8/1971 | Ris | 280/11.37 E |

FOREIGN PATENT DOCUMENTS

| | | | |
|---|---|---|---|
| 214,326 | 3/1961 | Austria | 280/607 |

*Primary Examiner*—Joseph F. Peters, Jr.
*Assistant Examiner*—Milton L. Smith
*Attorney, Agent, or Firm*—Sherman Levy

[57] ABSTRACT

A device for attachment to skis comprising a vertical member and a base plate on which said vertical member can move relative to the base plate. The vertical member may be springhinged to the base plate. The vertical member is preferably airfoil shaped.

6 Claims, 5 Drawing Figures

FIG. 1
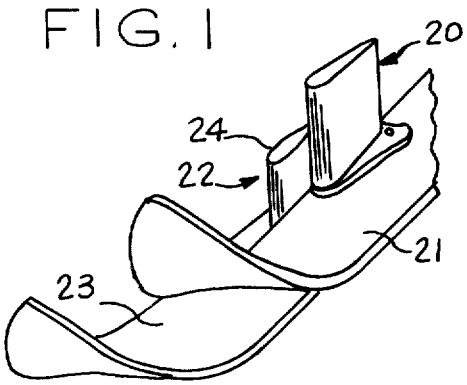
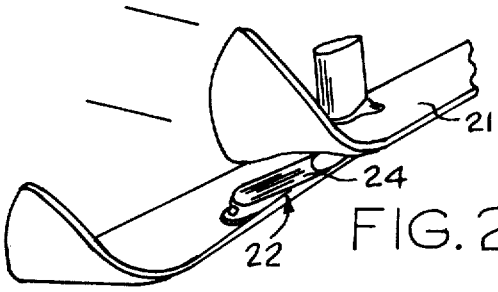
FIG. 2
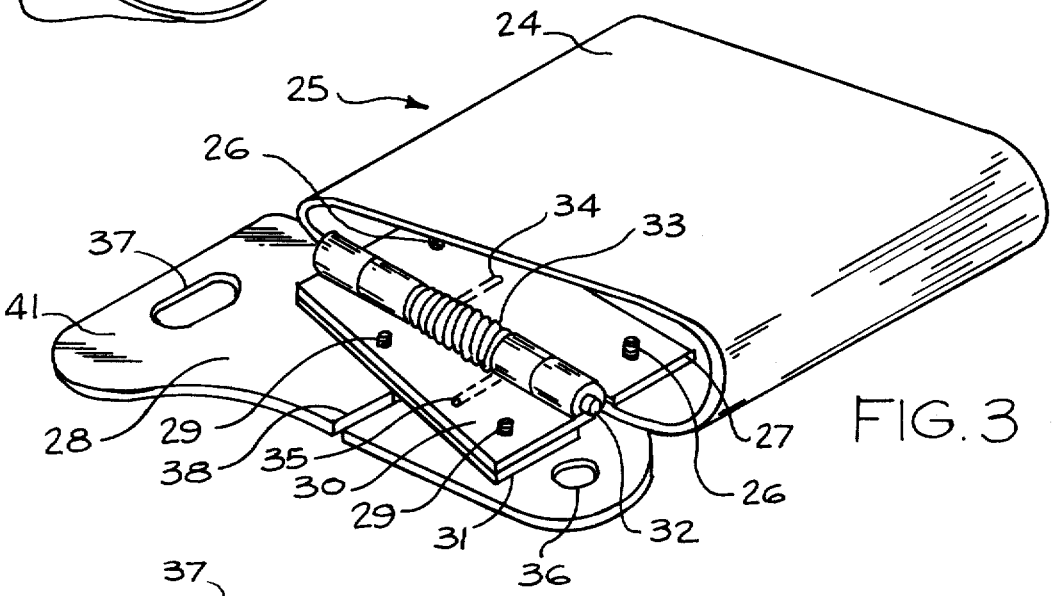
FIG. 3
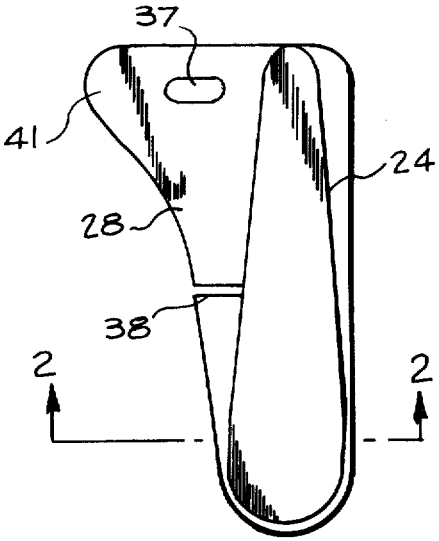
FIG. 4
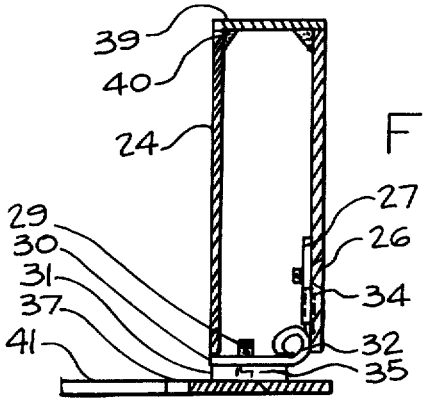
FIG. 5

SKI ANTI-CROSSING DEVICE

Matter enclosed in heavy brackets [ ] appears in the original patent but forms no part of this reissue specification; matter printed in italics indicates the additions made by reissue.

This invention relates generally to ski attachments and, in particular, to a device which substantially will prevent skis from crossing, reduce ski tip vibration, and assist in directional control.

In skiing one of the most dangerous situations in the crossing of ski tips or tails. Slalom racers, in the attempt to ski more quickly and more closely to the slalom poles, could bring the skis dangerously close to crossing. The novice, in learning to ski, initially learns the snow plow technique and often will cross his tips resulting in a fall which discourages him from an early transition into parallel skiing. The intermediate skier who wishes to improve his parallel skiing quite often lacks the confidence due to fear of tip crossing at high speed.

Further, and in particular in downhill racing, when going over bumps or moguls, the forebody of the ski striking a bump is forced into a vertical flexing and oscillation sometimes of sufficiently large magnitude as to cause loss of control or stability. Ski crossing could result. By adding a weight of a few ounces to the forebody of the ski the inertia is increased so that the amplitude of the vertical oscillation is reduced sufficiently to improve noticeably the ski's stability and holding ability, especially on ice.

In hot-dog skiing, or other acrobatic type of skiing, it is possible also to cross the skis. In all these modes of skiing, crossing can be prevented by placing a blocking member on the forebody and/or aftbody of the ski. Ski crossing can be prevented however only within the effective height of the device which has to be limited for practical and safety reasons. Therefore should the lift of a crossing ski exceed the height of the device it could be trapped on the other side of the device and cause serious injury, unless the device contains means to avoid this.

When used on the tails of the skis, proper shape of the device, i.e., airfoil, could contribute to directional control and stability and act essentially as a rudder, particularly for racing, jumping and deep powder skiing.

Further it is important that the flexing characteristic of the ski with the attachment is not affected appreciably so that the desirable ski dynamics are maintained. The design of the device and in particular the base portion is therefore important and should not stiffen the ski.

Further the device should be light in weight and not appreciably add to the drag of the ski at high speed or in deep powder snow.

Various prior devices have been employed to prevent skis from crossing but none meet all the above requirements. These prior efforts have been generally of the fixed type attached to the skis by screws or by an adhesive; and once a crossing ski goes over the effective height of the device it is difficult to recover, requiring lifting of the ski back over the device. The safety feature of prior devices in preventing crossed skis in one direction is consequently negated.

Prior art is described in the following patents:

| | | |
|---|---|---|
| 2,455,920 | Ebbley, Jr. | Dec. 14, 1948 |
| 2,611,624 | Gurvich | Sept. 23, 1952 |
| 2,625,405 | Staff | Jan. 13, 1953 |
| 3,148,891 | Heuvel | Sept. 15, 1964 |
| 3,295,860 | Von Hoven | Jan. 3, 1967 |

None of these patents effectively solves the problem of recovery in the case where a ski has been trapped on the far side of the device without requiring the ski to be lifted over the device.

The present invention satisfies the herein mentioned requirements and in particular solves the problem of recovery, without requiring the lifting of the ski over the device, by spring-hinging the device. Consequently, crossing is prevented in one direction only. If a crossing ski rises higher than the effective height of the device then recovery is made by moving the ski back into position and the device will swing down out of the way as the ski slides over it. Once the ski has cleared, the device will spring back to the vertical position ready to prevent crossing. The device is lightly spring-loaded so that little effort is required to swing it down.

The body of the device is airfoil shaped so as to reduce the drag at high speed and in deep powder snow. When mounted on the tails of the skis it will act as a directional aerodynamic rudder. An elongated mounting hole is provided so that the orientation of the device can be adjusted according to the skier's preference. Also the base of the device is slotted so as to reduce its stiffness and not affect the dynamics of the ski.

Tests by ski instructors and racers have confirmed the effectiveness of the device in preventing crossing. The effectiveness of the articulated feature as well as the stabilizing effect has also been confirmed.

An object of this invention is to provide an anti-crossing device for skis which is capable of substantially preventing ski crossing in one direction only.

Another object of this invention is to provide an anti-crossing device for skis wherein the vertical member is spring-hinged to provide fast return to the normal skiing position.

Another object of this invention is to provide an anti-crossing device for skis capable of flexing with the ski.

Another object of this invention is to provide an anti-crossing device for skis with an airfoil profile for reduced drag is deep powder snow or at high speed.

Another object of this invention is to provide an anti-crossing device for skis with an airfoil profile capable of easily being adjusted.

Further objects and advantages of the invention will be apparent from the following description, reference being had to the accompanying drawings, wherein a preferred embodiment of the invention is clearly shown in which:

FIG. 1, is a perspective view of the anti-crossing device mounted on the forebody of the skis demonstrating the manner in which the device on the right ski prevents the left ski from crossing.

FIG. 2, is a perspective view of the anti-crossing device mounted on the forebody of the skis demonstrating the manner in which the device on the right ski is swung flat by the action of the left ski recovering from a crossed position.

FIG. 3, is a perspective view of the anti-crossing device for the right hand ski, in the swung-down position, showing the spring hinge.

FIG. 4, is a top view of the device for the right ski, showing the slotted base.

FIG. 5, is a vertical section of the right ski, taken along line 2—2 in FIG. 4, and showing the airfoil member vertical to the base in the normal position.

FIGS. 3, 4 and 5, show the device for the right ski. The device for the left hand ski is opposite hand or a mirror image of the right.

Referring to FIG. 1, the left anti-crossing device 20 is mounted onto the surface of the left ski 21 approximately 13 inches from the tip. Similarly the right anti-crossing device 22 is mounted onto the right ski 23. In operation the airfoil shaped body 24 of the right side device 22 is shown blocking the left ski 21 and preventing it from crossing.

Referring to FIG. 2, the airfoil shaped body 24 of the right side device 22, in operation, is shown deflecting under the side action of the left ski 21 as it is brought out of a crossed position.

Referring to FIG. 3 the right side anti-crossing device 25 is shown in the open position with the torsion spring 33 in the loaded condition so that the airfoil shaped body 24 could spring back into the vertical position when released. Anti-crossing device 25 comprises an airfoil shaped body member 24 attached by screws 26 to the upper hinge leaf 27, and a base 28 attached by screws 29, to the lower hinge leaf 30, separated from the base 28 by spacer 31. The upper hinge leaf 27 and the lower hinge leaf 30 are connected by means of a hinge pin 32 passing through torsion spring 33. The upper torsion spring end 34 is captured between upper hinge leaf 27 and the airfoil body 24 and the lower torsion spring end 35 is captured between lower hinge leaf 30 and the base plate 28. The base 28 contains a forward mounting screw hole 36 and an elongated mounting screw hole 37 for the lateral adjustment of the anti-crossing device. Base 28 also contains slot 38 to reduce its stiffness. The base is screwed to the ski by suitable screws through the mounting holes.

Referring to FIG. 4, the base 28 is shaped so that a torque arm 41 is formed to offer resistance to the overturning of the anti-crossing device when it is struck by a crossing ski. The torque arm is formed by making the base substantially wider at one end than at the other. This provides the overturning resistance with the minimum increase in stiffness. One or more slots, 38, may be made in the mounting base 28, to reduce its stiffness.

Referring to FIG. 5, the airfoil body 24 is hollow and contains cap 39 attached by a suitable adhesive 40.

It is evident that the anti-crossing device can be injection molded from a suitable lightweight plastic preferably of the high impact type without substantially changing its functional design and effectiveness. It is also clear that the wall thickness and specific shape of the airfoil body 24 can be selected to afford a degree of elasticity in the vertical direction as a further safety measure. It is also clear that the base 28 can be proportioned so that other means of attachment to the ski are possible, such as by an adhesive. It is also evident that the base stiffness can be reduced by the addition of more slots 38, said slots not necessarily penetrating the full depth of the base 28.

What is claimed is:

[1. Means for attachment to the upper surfaces adjacent an end of skis comprising a first base plate, mounted on a first ski, a first member pivotally mounted on said first base plate, a second base plate mounted on a second ski, a second member pivotally mounted on said second base plate, said members being pivoted about an axis parallel to the longitudinal axis of said skis, said members being spring loaded to the vertical position, each said member being adapted to block the other ski from crossing it but yielding in the direction that will unlock the other ski if the other ski has crossed a member.]

2. Apparatus as in claim [1] *7* in which said movable member is airfoil shaped.

3. Apparatus as in claim [1] *7* in which said base plate contains means such as slots for reducing the stiffness of the base plate.

4. Apparatus as in claim [1] *7* in which means are provided for adjustment of said attachment means relative to the ski.

5. Apparatus as in claim [1] *7* wherein said base plate is substantially wider at one end than at the other for purposes of providing a torque arm.

*6. Means for attachment to the upper surfaces adjacent an end of skis comprising a fist base plate, mounted on a first ski, a first member pivotally mounted on said first base plate,*

*a second base plate mounted on a second ski, a second member pivotally mounted on said second base plate, said members being pivoted about an axis extending in the direction of the longitudinal axis of said skis,*

*said members being spring loaded to the vertical position, each said member being adapted to block the other ski from crossing it but yielding in the direction that will unblock the other ski if the other ski has crossed a member.*

*7. Means for attachment to the upper surfaces adjacent an end of skis comprising a first base plate, mounted on a first ski, a first member pivotally mounted on said first base plate,*

*a second base plate mounted on a second ski, a second member pivotally mounted on said second base plate, said members being pivoted about an axis generally parallel to the upper surfaces of said skis and generally longitudinally thereof,*

*said members being spring loaded to the vertical position, each said member being adapted to block the other ski from crossing it but yielding in the direction that will unblock the other ski if the other ski has crossed a member.*

* * * * *